United States Patent
N et al.

(10) Patent No.: US 12,211,051 B2
(45) Date of Patent: Jan. 28, 2025

(54) METHODS AND SYSTEMS FOR ANOMALOUS OPERATION DETECTION ON A CONSUMER DEVICE

(71) Applicant: Dell Products L.P., Round Rock, TX (US)

(72) Inventors: Vaneeswaran N, Erode (IN); Anushree Priyadarshini, Bangalore (IN); Rahul Deo Vishwakarma, Los Angeles, CA (US)

(73) Assignee: Dell Products L.P., Round Rock, TX (US)

( * ) Notice: Subject to any disclaimer, the term of this patent is extended or adjusted under 35 U.S.C. 154(b) by 365 days.

(21) Appl. No.: 17/726,825

(22) Filed: Apr. 22, 2022

(65) Prior Publication Data

US 2023/0342783 A1    Oct. 26, 2023

(51) Int. Cl.
    *G06Q 20/40* (2012.01)
(52) U.S. Cl.
    CPC ............................. *G06Q 20/4016* (2013.01)
(58) Field of Classification Search
    CPC .................... G06Q 20/4016; G06F 21/554
    See application file for complete search history.

(56) References Cited

U.S. PATENT DOCUMENTS

| 10,985,970 | B1* | 4/2021 | Goyal | G06F 16/2477 |
| 11,593,639 | B1* | 2/2023 | Garg | G06F 18/2415 |
| 2015/0121518 | A1* | 4/2015 | Shmueli | H04L 63/1425 726/22 |
| 2018/0276566 | A1* | 9/2018 | Zhang | C07F 15/025 |
| 2018/0373877 | A1* | 12/2018 | Bruso | G06F 21/552 |
| 2020/0028850 | A1* | 1/2020 | Ouellette | H04L 63/08 |
| 2020/0150653 | A1* | 5/2020 | Goldman | H04W 4/024 |
| 2022/0224611 | A1* | 7/2022 | Nadger | H04L 43/022 |
| 2022/0382713 | A1* | 12/2022 | Sadiq | G06F 16/27 |
| 2024/0106846 | A1* | 3/2024 | Kapoor | H04L 63/10 |

FOREIGN PATENT DOCUMENTS

CA             2547708 C      7/2010

\* cited by examiner

*Primary Examiner* — J. Brant Murphy
(74) *Attorney, Agent, or Firm* — Chamberlain, Hrdlicka, White, Williams & Aughtry; Aly Dossa

(57) ABSTRACT

A method for holding an anomalous privileged operation, that includes receiving, by a privileged operations monitor executing on a client device, a privileged operation request to copy data or modify data, obtaining a plurality of metrics for the privileged operation request, calculating an anomaly score for the privileged operation request, based on the plurality of metrics, making a first determination, based on the anomaly score, that the privileged operation request is anomalous, and based on the first determination, placing a hold on the privileged operation request.

15 Claims, 4 Drawing Sheets

METHODS AND SYSTEMS FOR ANOMALOUS OPERATION DETECTION ON A CONSUMER DEVICE

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

DETAILED DESCRIPTION

Figure 1:
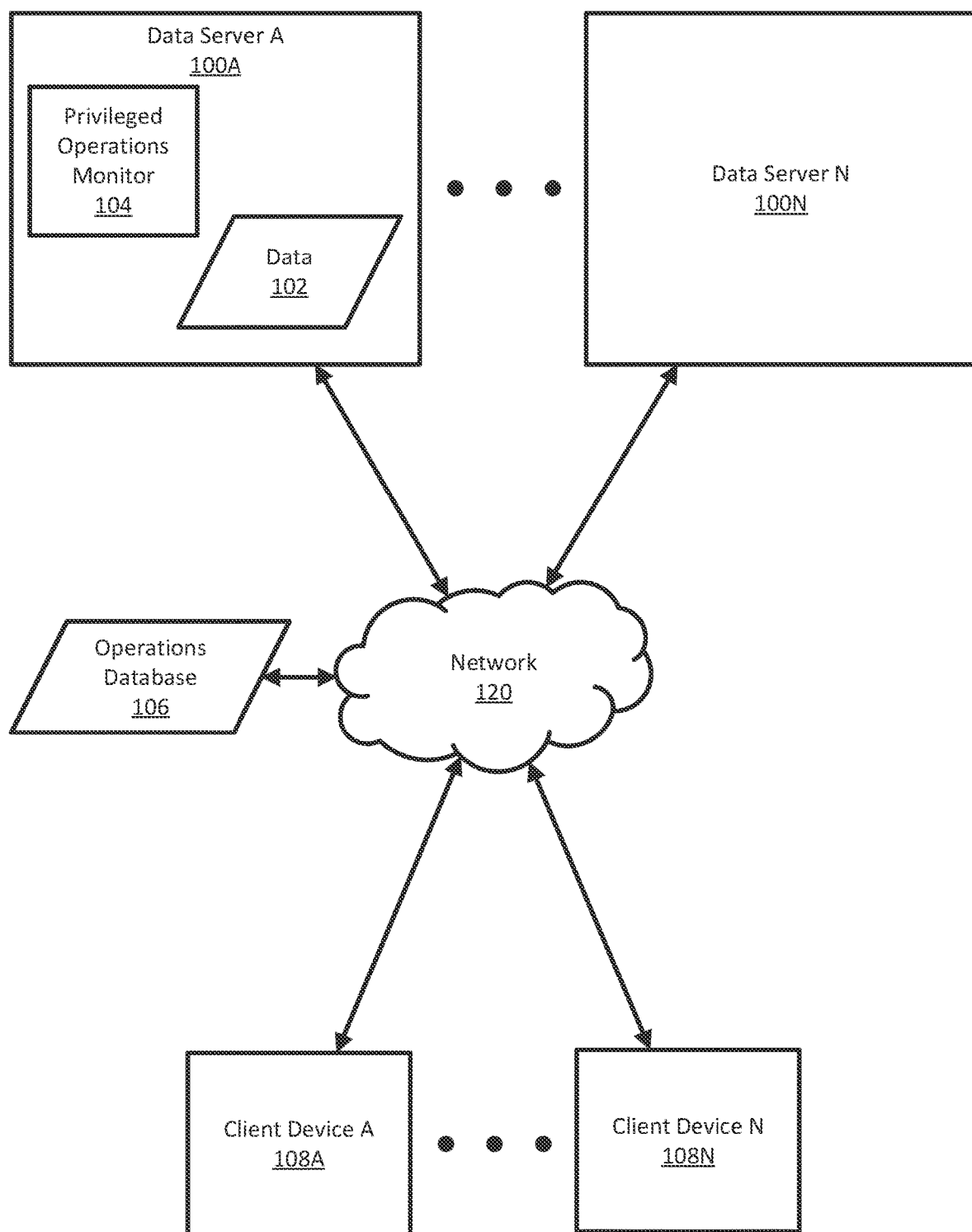
FIG. 1 shows a diagram of system, in accordance with one or more embodiments of the invention.

In general, embodiments of the invention relate to systems and methods for identifying, intercepting, analyzing, and permitting or blocking privileged operations. A computing system (e.g., an enterprise server, personal computer, etc.) may store information that is sensitive to a business entity (e.g., customer, patient, employee information) or to an individual (e.g., personal, financial, medical information). Accordingly, such computing systems may become the target of malicious actors (e.g., hackers) attempting to gain access to the information on that computing system (e.g., "device").

One method employed by malicious actors is to extort money (or other valuable consideration) from a device owner via "ransomware", where a malicious actor gains access to the data on the device, encrypts the data, then refuses to provide the decryption keys to the owner until a "ransom" is paid. Accordingly, the owner of the data is unable to access, modify, or fully utilize their device until the data is decrypted and the ransomware is removed. In some situations, a malicious actor copies the data from the device to their own (the hacker's) device and threatens to publicly release the data if a ransom is not paid. Although not mentioned here, there exist additional methods (and variations of methods) malicious actors may use to extort business organizations and individual. For example, after gaining access to a device, the malicious actor may initiate a "denial-of-service" (DoS) attack by causing the device to use a significant allocation of the device's available resources (processor and/or memory) (e.g., an out-of-memory (OOM) fault) causing the device to "freeze" or reboot (where the attack may be performed again after the system starts).

However, in order for a malicious actor to perform their attack, not only does the malicious actor need to first (1) gain access to the device storing the data, but the malicious actor then needs to (2) perform a privileged operation on the data (i.e., modify the data to encrypt the data, read the data to copy the data, etc.) or the system (e.g., cause the device to go "out-f-memory"). While there are significant efforts to prevent malicious actors from performing the first step (gaining access to the device), the malicious actor may additionally be stopped at the second step (performing privileged operations on the device) even if improper access to the device is gained.

As a non-limiting example, in some scenarios, a malicious actor may gain access to an employee's account within a business organization (e.g., using a phishing attack) thereby gaining access to any business data that employee has permission to access. Then, using that employee's account, the malicious actor will copy and/or encrypt the business's data so that the business may be extorted. While it is ideal if the malicious actor does not gain access to the employee account at all, one or more embodiments discussed herein provides system and methods to prevent the malicious actor from performing privileged operations on the data or devices within the business's network (i.e., the second step of the attack).

As discussed in more detail herein, an enterprise server, consumer laptop, and/or any other computing device may execute a "privileged operations monitor" that observes, tracks, records, and analyzes privileged operations occurring on the computing system. Specifically, the privileged operations monitor may receive (or otherwise intercept) a privileged operation request and, using one or more metrics (e.g., martingales) of the privileged operation request, calculate an "anomaly score" for the privileged operation request. Then, depending on that score, the operation may be blocked, quarantined pending review, or allowed. Accordingly, privileged operations that would permit a malicious actor to retrieve data (i.e., copy), encrypt data (i.e., modify), or perform a control operation (i.e., causing an out-of-memory fault) may be prevented by the privileged operations monitor.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details, known to those of ordinary skill in the art, may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

As used herein, the word 'data' is treated as an "uncountable" singular noun (and not as the plural form of the singular noun 'datum'). Accordingly, throughout the application, 'data' is paired with a singular verb when written (e.g., "data is"). However, this usage should not be interpreted to redefine 'data' to mean only a single bit of information. Rather, as used herein, 'data' means any one or more bits of information that are logically and/or physically grouped. Further, 'data' may be treated as a plural if context provides the existence of multiple 'data' (e.g., "two data are combined").

FIG. 1 shows a diagram of system, in accordance with one or more embodiments of the invention. The system may include one or more data server(s) (e.g., data server A (100A), data server N (100N)), a network (e.g., network (120)), an operations database (e.g., operations database (106)), and/or one or more client device(s) (e.g., client device A (108A), client device N (108N)). Each of these components is described below.

In one or more embodiments, a computing device is hardware that includes one or more processor(s), memory (volatile and/or non-volatile), persistent storage, internal physical interface(s) (e.g., serial advanced technology attachment (SATA) ports, peripheral component interconnect (PCI) ports, M.2 ports, etc.), external physical interface(s) (e.g., universal serial bus (USB) ports, recommended standard (RS) serial ports, audio/visual ports, etc.), communication interface(s) (e.g., network ports, small form-factor pluggable (SFP) ports, wireless network devices, etc.), input and output device(s) (e.g., human interface devices), or any combination thereof. Further, in one or more embodiments, the persistent storage (and/or memory) of the computing device may store computer instructions (e.g., computer code) which, when executed by the processor(s) of the computing device (e.g., as software), cause the computing device to perform one or more processes specified in the computer instructions.

Non-limiting examples of a computing device include a network device (e.g., switch, router, multi-layer switch, etc.), a server (e.g., a blade-server in a blade-server chassis, a rack server in a rack, etc.), a personal computer (e.g., desktop, laptop, tablet, smart phone, personal digital assistant), and/or any other type of computing device with the aforementioned capabilities.

In one or more embodiments of the invention, a data server (100) is a computing device. A data server (100) may include one or more forms of data (e.g., data (102)) stored on a storage device (not shown) and a privileged operations monitor (e.g., privileged operations monitor (104)) executing on the data server (100).

In one or more embodiments of the invention, data (102) is digital information stored on a computing device (i.e., in a storage device and/or in memory). In one or more embodiments of the invention, data (102) may include one or more individual data components (e.g., blocks, files, records, etc.) that may be separately read, copied, erased, and/or otherwise modified. One of ordinary skill in the art, having the benefit of this detailed description, would appreciate what data (102) is and how data is used on computing devices.

In one or more embodiments of the invention, a privileged operations monitor (104) is software executing on a data server (100). In one or more embodiments of the invention, when executing on a data server (100), a privileged operations monitor (104) may receive "on-demand" commands/requests to evaluate privileged operation requests. That is, as a non-limiting example, a privileged operations monitor (104) may not "monitor" for all privileged operation requests, but instead, a privileged operations monitor (104) may be executed (used "on-demand") whenever a privileged operation request needs to be evaluated to determine if the privileged operation request is anomalous. Additionally, in one or more embodiments of the invention, a privileged operations monitor (104) executing on a data sever (100) may be configured to "monitor" all privileged operation requests. The privileged operations monitor (104) may perform one or more of the steps discussed in FIG. 4.

In one or more embodiments of the invention, a privileged operation request may be either a request to perform a management operation or a request to perform a filesystem operation. Non-limiting examples of a management operation include opening one or more new connection(s) (e.g., a secure shell (SSH) session, a telnet session), initiating one or more resource intensive operation(s) (e.g., starting programs/applications, performing large tasks sufficient to utilize some threshold of processor and/or memory utilization, etc.), or initiating any other process that may cause the data server (100) to use more resources (processor and/or memory) and interrupt existing processes (e.g., causing the data server (100) to go out-of-memory and shut down and/or reboot, or slowing the data server (100) to pause other/existing/legitimate operations). Non-limiting examples of a filesystem operation include reading, writing, or modifying any data (102), or reading, writing, or modifying an index node (inode) or any other filesystem data structure. Privileged operation requests may be received, by the data server (100), from one or more client device(s) (108), from other data server(s) (100), and/or from any other device operatively connected to the data server (100).

In one or more embodiments of the invention, a client device (108) is a computing device. Non-limiting examples of a client device (108) include a computing device in an enterprise environment (e.g., an employee workstation, laptop, cellphone), a consumer device for personal use (e.g., a personal desktop, laptop, cellphone, etc.), or any other computing device that may operatively connect to a data server (100). Additional details regarding a client device (108) may be found in the description of FIG. 2.

In one or more embodiments of the invention, an operations database (106) is a collection of operation metrics entries (not shown) in a data structure. The operations database (106) may be stored on a data server (100), on a server specific to the operations database (106), or any computing device operatively connected to the network (120). The operations database (106) may be a one or more file(s). Additional details regarding the operations database (106) may be found in the description of FIG. 3.

In one or more embodiments of the invention, a network (120) is a collection of connected network devices (e.g., data server(s) (100), operations database (106), client device(s) (108), etc.) that allow for the communication of data from one network device to other network devices, or the sharing of resources among network devices. Examples of a network (e.g., network (120)) include, but are not limited to, a local area network (LAN), a wide area network (WAN) (e.g., the Internet), a mobile network, or any other type of network that allows for the communication of data and sharing of resources among network devices and/or devices operatively connected to the network (120). One of ordinary skill in the art, having the benefit of this detailed description, would appreciate that a network is a collection of operatively connected devices that enables communication between those devices.

While FIG. 1 shows a specific configuration of a system, other configurations may be used without departing from the scope of the invention. Accordingly, embodiments disclosed herein should not be limited to the configuration of devices and/or components shown in FIG. 1.

Figure 2:
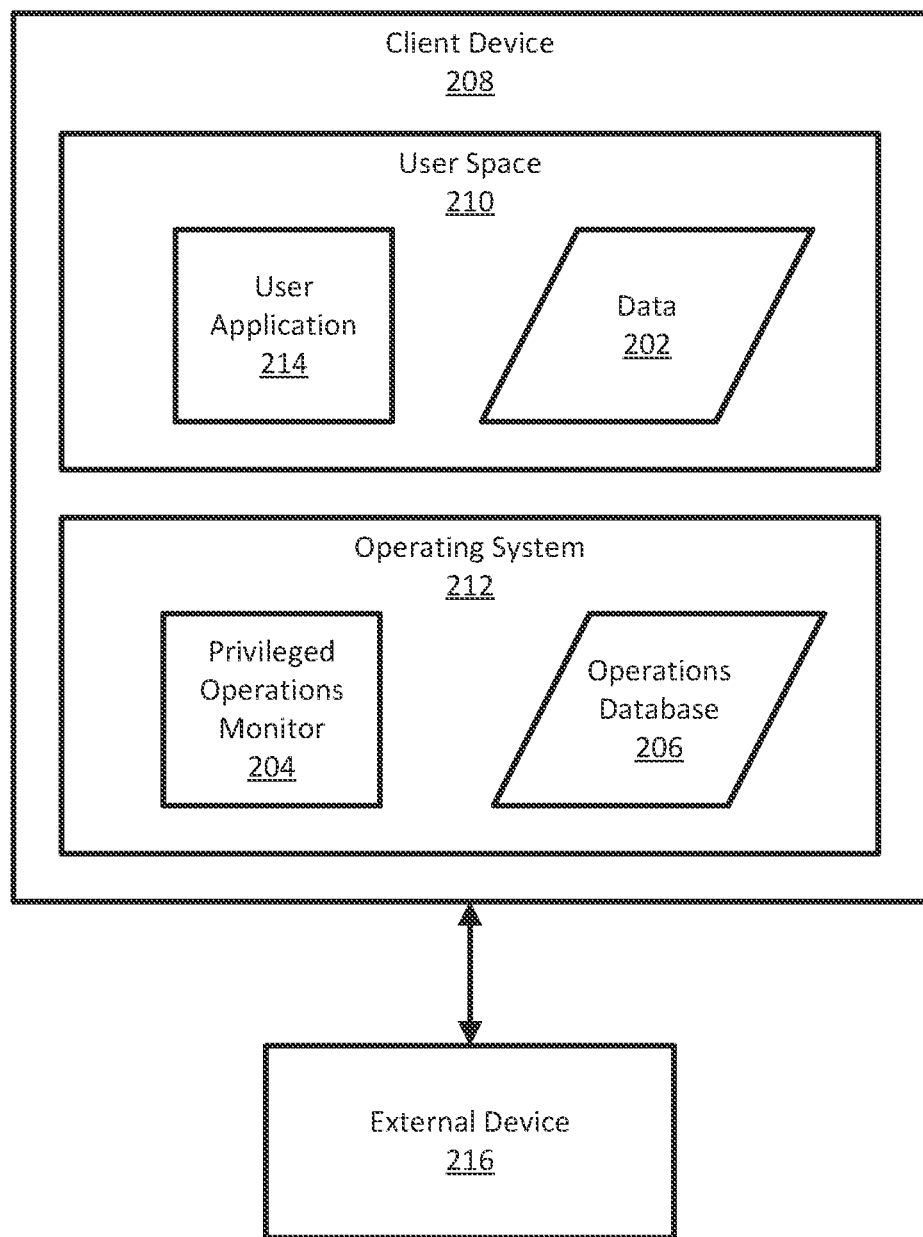
FIG. 2 shows a diagram of a client device, in accordance with one or more embodiments of the invention.

FIG. 2 shows a diagram of a client device, in accordance with one or more embodiments of the invention. A client device (e.g., client device (208)) may include a user space (e.g., user space (210)) and an operating system (e.g., operating system (212)). Similarly named and/or similarly numbered components of FIG. 2 have all of the same properties as discussed in the description of FIG. 1. Accordingly, only additional components are described below.

In one or more embodiments of the invention, user space (210) is a software environment executing on a client device (208) that generally provides a virtual space in which user-initiated software executes (e.g., programs, applications, etc.). In one embodiment of the invention, user space (210) does not have direct access to underlying hardware components of the client device (208). Instead, user space (210) software must provide commands and/or requests to the operating system (212), which coordinates the exchange of information between user space software and hardware layer components. A user space (210) may include one or more applications (e.g., user application (214)) and data (e.g., data (202)), described below.

In one or more embodiments of the invention, a user application (214) is software executing within the user space (210), that may include instructions which, when executed by a processor (not shown) of the client device (208), may initiate the performance of one or more operations of the client device (208).

In one or more embodiments of the invention, an operating system (212) is software executing on the client device (208). In one embodiment of the invention, an operating system (212) coordinates operations between software executing in user space (210) and one or more hardware components of the client device (208). The operating system (212) may include a privileged operations monitor (e.g., privileged operations monitor (204)) and an operations database (e.g., operations database (206)). In one embodiment of the invention, the operating system (212) may be executing software (e.g., the privileged operations monitor (204)) that monitors data traversing the operating system (212) and may intercept, modify, and/or otherwise alter that data based on one or more conditions. The privileged operations monitor (204) may execute in the operating system (212) (and/or kernel) so that privileged operations may be efficiently identified and analyzed without consuming the memory and resources required to operate in user space (210). Specifically, the privileged operations monitor (204) may intercept system calls and/or disk input-output (IO) operations at the kernel-level without needing to execute user space (210) applications.

In one or more embodiments of the invention, a privileged operations monitor (204) is software executing on a client device (208). In one or more embodiments of the invention, when executing on a client device (208), a privileged operations monitor (204) may receive "monitor" commands/requests to evaluate privileged operation requests. That is, as a non-limiting example, a privileged operations monitor (204) may be executing in the operating system (212) and/or kernel and therefore may identify, analyze, and/or track all systems calls and/or 10 operations. Additionally, in one or more embodiments of the invention, a privileged operations monitor (204) executing on a client device (208) may be configured to execute "on-demand" to evaluate a privileged operation request, when requested. Privileged operation requests may be received, by the user space (208) (e.g., malware, ransomware, etc.), by a remote connection (e.g., received over a network), and/or from the operating system (e.g., rootkit malware, compromised kernel software, etc.). The privileged operations monitor (204) may perform one or more of the steps discussed in FIG. 4.

In one or more embodiments of the invention, an external device (e.g., external device (216)) is a hardware component that operatively connects to the client device (208). Non-limiting examples of an external device (216) include a flash drive, an external hard drive, a compact disc, a cellular telephone, and/or any other device that may interact with the client device (208) to allow for the exchange of data (202) between the client device (208) and the external device (216).

The client device (208) of FIG. 2 shows a client device (208) that may be configured for a consumer environment, where the sensitive data (202) is likely to be stored locally on the client device (208) instead of a data server (as shown in FIG. 1). However, a client device (208) in an enterprise environment (e.g., like that of FIG. 1) may also be configured as shown in FIG. 2.

While FIG. 2 shows a specific configuration of a system, other configurations may be used without departing from the scope of the invention. Accordingly, embodiments disclosed herein should not be limited to the configuration of devices and/or components shown in FIG. 2.

Figure 3:
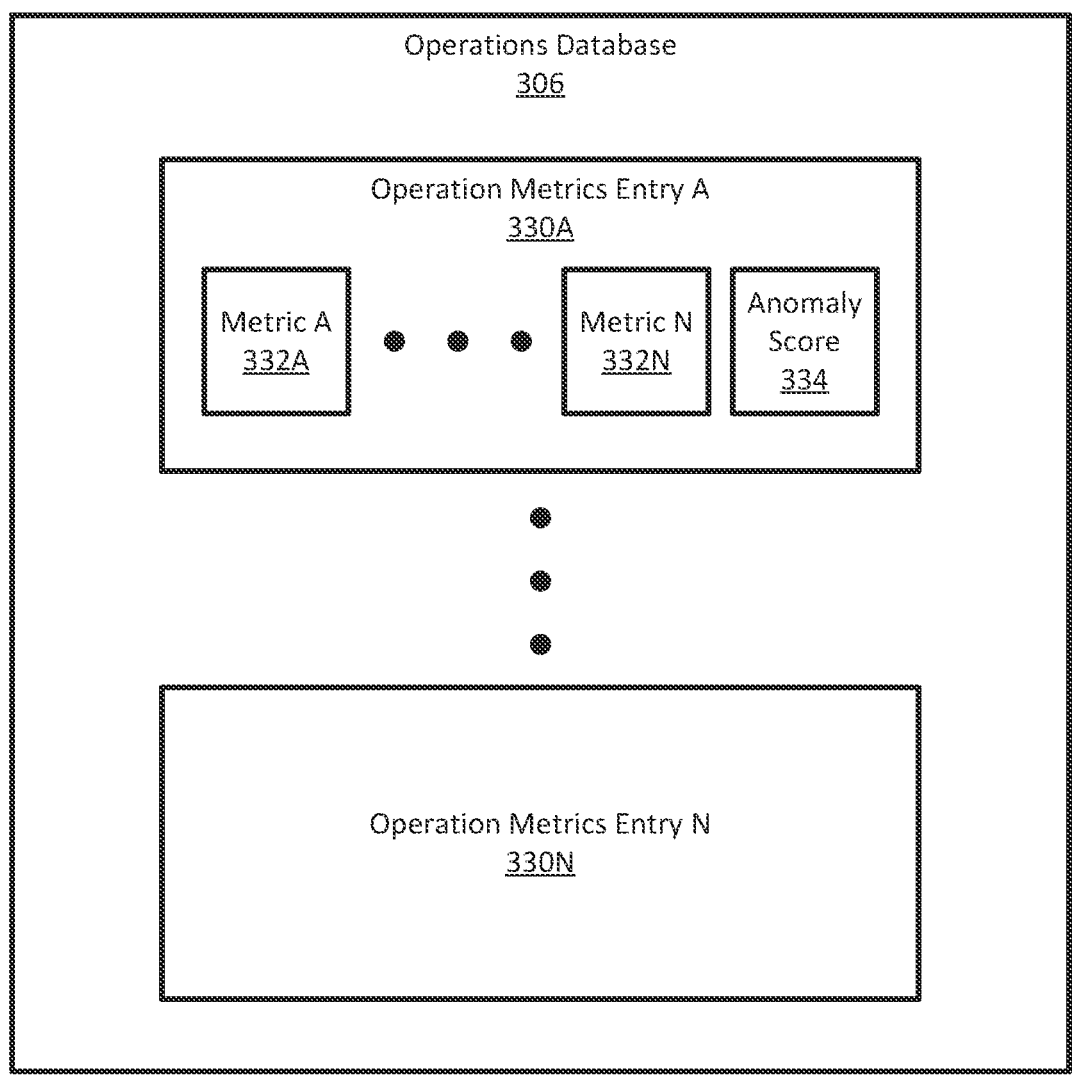
FIG. 3 shows a diagram of an operations database, in accordance with one or more embodiments of the invention.

FIG. 3 shows a diagram of an operations database, in accordance with one or more embodiments of the invention. The operations database (306) may include one or more operation metrics entries (e.g., operation metrics entry A (330A), operation metrics entry N (330N)).

In one or more embodiments of the invention, operation metrics entry (330) is a data structure that includes one or more metric(s) (e.g., metric A (332A), metric N (332N)) and an anomaly score (334) related to an individual privileged operation. Non-limiting examples of a privileged operation include a read, write, and/or modify operation on data stored on a data server (or client device). Additional non-limiting examples of a privileged operation include operations to modify the permissions and/or access capabilities of a user (e.g., a user account attempting elevate its own or another account's permissions to access data).

In one or more embodiments of the invention, a metric (332) is a single entry of metadata related to a single privileged operation (the same privileged operation associated with all of the metrics (332) within a single operation metrics entry (330)). Non-limiting examples of a metric include a:

(i) time (e.g., timestamp, epoch time),
(ii) user (e.g., account identifier),
(iii) role (e.g., user group, user category),
(iv) client device identifier,
(v) data server identifier,
(vi) control path (e.g., management operations, setting a network time protocol (NTP) server, changing a user password, etc.),
(vii) operation type (i.e., read, write, or modify),
(viii) frequency (e.g., how often the privileged operation request is made—every 1 second, 10 hours, 1 week, etc.),
(ix) payload size (e.g., 100 kB, 15 TB, etc.),
(x) concurrency (e.g., how many of the similar/same privileged operations are currently executing),
(xi) priority (e.g., a comparative ranking of privileged operation importance—writing data is higher priority than reading system logs),
(xii) current session attached device duration (e.g., the amount of time the attached device has been continuously connected to the client device),
(xiii) total attached device duration (e.g., the amount of time the attached device has been connected to the client device summed across all sessions), and/or
(xiv) any other metadata relevant to an individual privileged operation.

In one or more embodiments of the invention, an anomaly score (334) is a numerical value calculated using one or more metrics (332) from the same operation metrics entry (330). An anomaly score (334) may be calculated by assigning a numerical value to one or more metric(s) then performing one or more mathematical operation(s) (e.g., addition, subtraction, multiplication, etc.) on those metric(s) to calculate the anomaly score (334).

In one or more embodiments of the invention, an identifier is an alphanumeric expression uniquely associated with any component (e.g., a account identifier, client device identifier, etc.). In one or more embodiments, an alphanumeric expression is a string of one or more letter(s), number(s), symbol (s), and/or other character(s). An alphanumeric expression may be encoded using a standard protocol for digital characters (e.g., Unicode, American Standard Code for Information Interchange (ASCII), etc.). In one embodiment, an alphanumeric expression may be provided by a user and uniquely identify the associated data to one or more users (e.g., "vol_4", "engineering", "sales_east", etc.). In one embodiment, an alphanumeric expression may be automatically generated by one or more computing devices (e.g., "syste_1", "path_A", "StorDev5"). One of ordinary skill in the art, having the benefit of this detailed description, would appreciate that there are many possible variations of alphanumeric expressions.

While FIG. 3 shows a specific configuration of a system, other configurations may be used without departing from the scope of the invention. Accordingly, embodiments disclosed herein should not be limited to the configuration of devices and/or components shown in FIG. 3.

Figure 4:
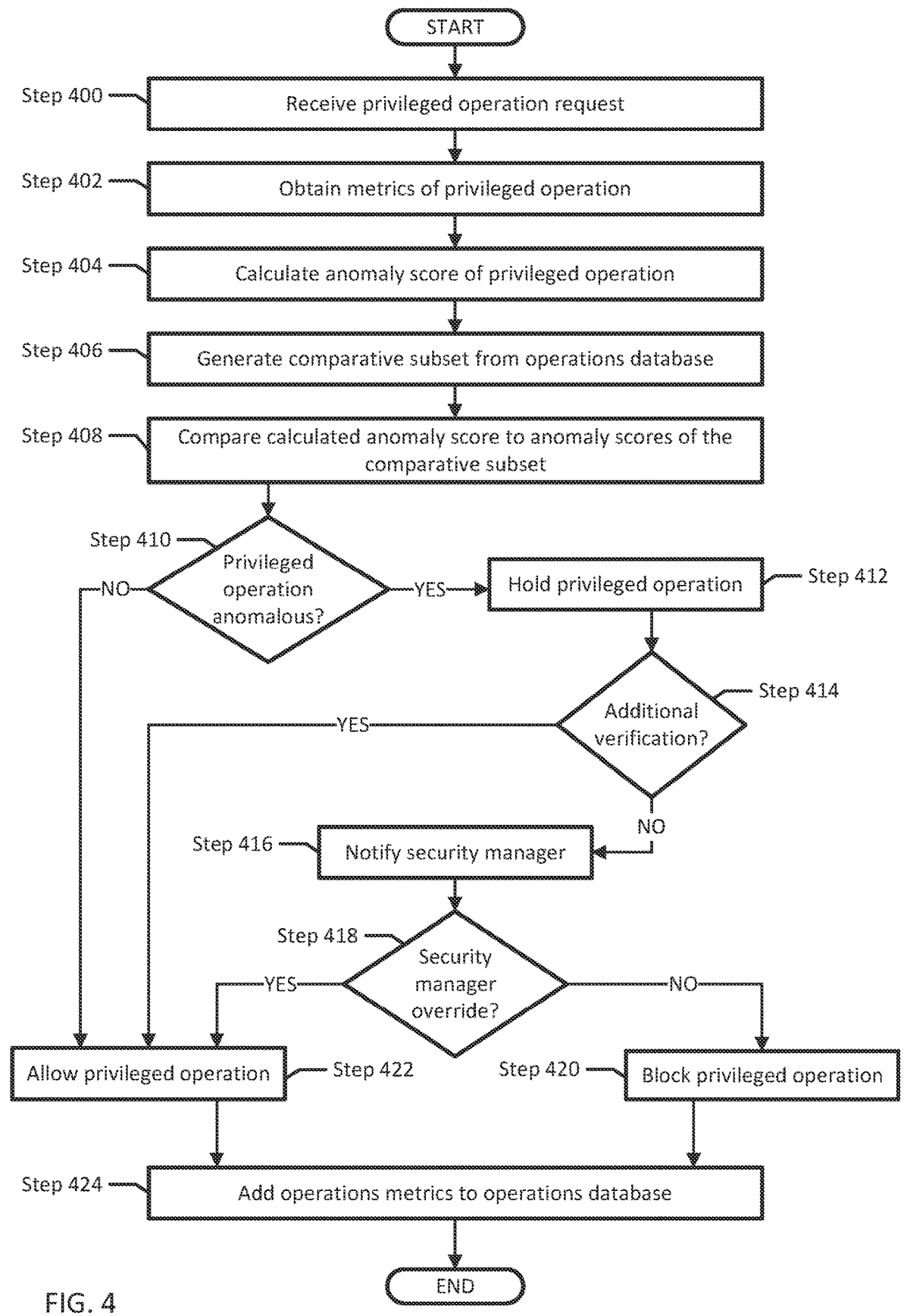
FIG. 4 shows a flowchart of a method of detecting and holding an anomalous privileged operation, in accordance with one or more embodiments of the invention.

FIG. 4 shows a flowchart of a method of detecting and holding an anomalous privileged operation, in accordance with one or more embodiments of the invention. All or a portion of the method shown in FIG. 4 may be performed by one or more components of the privileged operations monitor. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 400, the privileged operations monitor receives a privileged operation request (i.e., a request to perform a privileged operation). In one or more embodiments of the invention, the privilege operations monitor may not directly receive the privileged operation request, instead the privileged operations monitor may identify and intercept any privileged operation request that are received by the data server (and/or client device).

In Step 402, the privileged operations monitor obtains the metrics of the privileged operation. As shown in FIG. 3, the metrics for a single privileged operation may be combined into a single operation metrics entry. The metrics may be obtained from the privileged operation request itself (received in Step 400) or may additionally be obtained from the device that sent the privileged operation request.

In Step 404, the privileged operations monitor calculates the anomaly score of the privileged operation using the metrics of the privileged operation (obtained in Step 402). As discussed in the description of FIG. 3, the anomaly score may be calculated by assigning a numerical value to one or more metric(s) then performing one or more mathematical operation(s) (e.g., addition, subtraction, multiplication, etc.) on those metric(s) to calculate the anomaly score. In one or more embodiments of the invention, a larger anomaly score (a positive number further from 0) may be considered more anomalous than a smaller (closer to 0) anomaly score (e.g., "50" is more anomalous than "20").

As a non-limiting example, on a data server, if a privileged operation request is received to start an SSH session, the metrics for the privileged operation request may include the time (a low value because it is during business hours and this user regularly starts SSH sessions during business hours), account identifier (a low value for a user that regularly starts SSH sessions), a frequency (a low value showing only 1 request is sent every day), a concurrency (a low value because no other SSH sessions are currently active for this user), and any other relevant metrics. Accordingly, the anomaly score is a low value because summing the above metric (each with a low value) generates a lower combined anomaly score.

As another non-limiting example, on a data server, if a privileged operation request is received to start an SSH session, the metrics for the privileged operation request may include the time (a high value because this user does not regularly start SSHs sessions at 3 am), account identifier (a medium value for a user that irregularly starts SSH sessions), a frequency (a very high value showing this request is being made every few seconds), a concurrency (a high value because this user has SSH sessions are currently active), in addition to other metrics. Accordingly, the anomaly score is a high value because summing the above metric (each with medium to very high values) generates a higher combined anomaly score.

As another non-limiting example, if a privileged operation request is received to delete all files for a volume, the metrics for the privileged operation request may include operation type (a high value because the request is to modify (delete)), a payload size (a high value of 1 TB of data, 100% of the volume data), a current session attached device duration (a high value because the attached device has only been attached to the client device for 10 seconds), and a total attached device duration (a high value because the attached device has only been attached to the client device for 10 seconds (total)—making this the first time the attached device has been connected to the client device). Accordingly, the anomaly score is a high value because summing the above metric (each with medium to very high values) generates a higher combined anomaly score.

In Step 406, the privileged operations monitor generates a comparative subset of operation metrics entries from the operations database. In one or more embodiments of the invention, the operations database may include multiple operation metrics entries that have few, if any, metrics that are common to the privileged operation request (received in Step 400). Accordingly, the privileged operations monitor may look up, identify, and select a subset of operation metrics entries, from the operations database, based on one or more metrics that are common (i.e., the same) to the privileged operation request (received in Step 400) and those available in the operations database.

As a non-limiting example, the privileged operations monitor may select the comparative subset based on common metrics such as the time, user, operation type, and payload size. In one or more embodiments of the invention, the privileged operations monitor may be unable to generate a comparative subset of operation metrics entries. In such an instance, a privileged operation request may be allowed (Step 422) or disallowed (Step 420) by default until sufficient operation metrics entries are obtained and stored such that a comparative subset may be generated.

In Step 408, the privileged operations monitor compares the calculated anomaly score (calculated in Step 404) to anomaly scores of the comparative subset of operation metrics entries. In one or more embodiments of the invention, the privileged operations monitor sets one or more threshold(s) for determining whether an operation is considered anomalous. A threshold may be based on the anomaly scores of previous privileged operations that were determined to be anomalous and/or may be based on a percentile of anomaly scores from the comparative subset (e.g., 80th percentile, 90th percentile, etc.). In one or more embodiments of the invention, the privileged operations monitor may establish multiple thresholds (e.g., a "low" threshold and a "high" threshold, or any number of other thresholds) that may be used for varying purposes (as explained below).

In Step 410, the privileged operations monitor makes a determination as to whether the privileged operation is anomalous. In one or more embodiments of the invention, the determination may be based on whether the anomaly score (calculated in Step 404) for the privileged operation request (received in Step 400) surpasses a threshold when compared against the anomaly scores in a comparative subset (as compared in Step 408). In one or more embodiments of the invention, if there are multiple thresholds, surpassing the lowest threshold may be sufficient to consider the privileged operation anomalous (at least initially). If the privileged operation is determined to be anomalous (Step 410-YES), the method proceeds to Step 412. However, if the privileged operation is determined not to be anomalous (Step 410-NO), the method proceeds to Step 422.

In Step 412, the privileged operations monitor holds (e.g., quarantines, pauses, indefinitely delays) the privileged operation to prevent the privileged operation from occurring. In one or more embodiments of the invention, the privileged operations monitor may hold the privileged operation by providing a false status to the client device (that initially sent the privileged operation request) indicating that the process is starting or otherwise being performed at a very slow rate. Accordingly, by providing a false status to the client device, the client device will not immediately provide and error to the user (or user application) that the privileged operation is blocked. The privileged operations monitor may hold the privileged operation for whatever duration is allowed by the client device and/or data server.

In Step 414, the privileged operations monitor makes a determination if additional verification is provided. In one or more embodiments of the invention, the client device may be configured to allow for additional user authentication using advanced security features (e.g., multifactor authentication, biometric verification, etc.) In such instances where the client device is configured to received and/or accept such additional verification, the privileged operations monitor may be configured to allow privileged operations if additional verification is provided using those advanced security features.

As a non-limiting example, the privileged operations monitor may determine that the anomaly score of the privileged operation request surpasses a low threshold (Step 410-YES), but is below a high threshold. Accordingly, in such scenarios, the privileged operations monitor may be configured to allow the privileged operation if additional verification is provided. Whereas, if the anomaly score exceeded the high threshold, additional verification would not be sufficient to release the hold (set in Step 414) and additional verification would not be requested.

If additional verification is provided to the privileged operation monitor (or additional verification is not available on the client device) (Step 414-YES), the method proceeds to Step 422. However, if additional verification (is available, but) is not provided to the privileged operation monitor (Step 410-NO), the method proceeds to Step 416.

In Step 416, the privileged operations monitor notifies a security manager that a privileged operation request was determined to be anomalous (Step 410-YES) and is placed on hold (Step 412). In one or more embodiments of the invention, the security manager may be a software executing on one or more data server(s) and/or on one or more client device(s). In one or more embodiments of the invention, the notification sent to the security manager may be provided to one or more users (e.g., an information technology (IT) department, technology administrator, client device user, etc.). Non-limiting examples of the notification sent to one or more users include an email, a push notification on a companion mobile application, and/or a popup on the client device.

In Step 418, the privileged operations monitor makes a determination as to whether the security manager overrides the hold placed on the privileged operation (placed in Step 412). As discussed in Step 416, a security manager provides the ability to override the hold, if the security manager is instructed (i.e., commanded) to release the hold.

In one or more embodiments of the invention, the security manager notification may provide a means for overriding the block placed by the privileged operations monitor (in Step 412). As a non-limiting example, an email sent to the IT department may include a hyperlink that, when clicked, instructs the privileged operations monitor to release the hold placed on the privileged operation request.

Additionally, the security manager notification may provide a means to affirm the anomalous determination made by the privileged operations monitor. As a non-limiting example, a push notification send to a technology administrator's cellphone may provide an option to "confirm" the hold and therefore block the privileged operation (possibly in addition to an option to release the hold and allow the privileged operation).

If security manager is instructed to override the hold (Step 418-YES), the method proceeds to Step 422. However, if security manager is not instructed to override the hold (or the hold is affirmed) (Step 418-NO), the method proceeds to Step 420.

In Step 420, the privileged operations monitor blocks the privileged operation. In one or more embodiments of the invention, the hold placed on the privileged operation (at Step 412) is made permanent and/or the operation is otherwise disallowed from proceeding. A user interface on the client device may inform a user that the privileged operation has been blocked, the client device (and/or a program executing thereon) may return a read/write error as the data is inaccessible, or no notification may be provided to the client device. In one or more embodiments of the invention, failure to release the hold placed on the privileged operation (at Step 412) may cause the privileged operation to be blocked (e.g., via a timeout). Following Step 420, the method proceeds to Step 424.

In Step 422, the privileged operations monitor allows the privileged operation to proceed as requested in the privileged operation request, unencumbered by the privileged operations monitor. In one or more embodiments of the invention, the privileged operations monitor may allow the privileged operation to proceed because the privileged operation was determined not be anomalous, was specifically allowed by a security manager, and/or insufficient operation metrics entries existed to generate a comparative sub set.

In Step 424, the privileged operations monitor adds the operation metrics entries to the operations database. The privileged operations monitor may further add metadata regarding whether the privileged operation was determined to be anomalous or not. In one or more embodiments of the invention, where additional verification (Step 414-YES) is provided or the security manager overrides the initial hold (Step 418-YES), the privileged operations monitor may lower the score given to one or more metrics and/or the anomaly score overall, thereby allowing similar to privileged operations to occur in the future without be found anomalous. The method may end after Step 424.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for holding an anomalous privileged operation, comprising:
   receiving, by a privileged operations monitor executing on a client device, a privileged operation request to copy data or modify the data;
   obtaining a plurality of metrics for the privileged operation request;
   calculating an anomaly score for the privileged operation request, based on the plurality of metrics;
   making a first determination, based on the anomaly score, that the privileged operation request is anomalous;
   based on the first determination:
      placing a hold on the privileged operation request; and
      notifying a security manager that the privileged operation request is anomalous, wherein the security manager is operable to override the hold placed on the privileged operation request.

2. The method of claim 1, wherein the privileged operation request is to copy the data to an external device operatively connected to the client device.

3. The method of claim 2, wherein making the first determination that the privileged operation request is anomalous, comprises:
   comparing the anomaly score for the privileged operation request to a plurality of anomaly scores in a comparative subset of operation metrics entries, wherein the anomaly score for the privileged operation request exceeds a threshold based on the plurality of anomaly scores.

4. The method of claim 3, wherein prior to making the first determination that the privileged operation request is anomalous, the method further comprises:
   obtaining the comparative subset of operations metrics entries, comprising:
      selecting, in an operations database, a plurality of operation metrics entries, wherein the plurality of operation metrics entries each have a first metric that is identical to a second metric of the privileged operation request.

5. The method of claim 4, wherein the identical metric is one selected from the group consisting of an attached device identifier and a total attached device duration.

6. A non-transitory computer readable medium comprising instructions which, when executed by a computer processor, enables the computer processor to perform A method for holding an anomalous privileged operation, comprising:
   receiving, by a privileged operations monitor executing on a client device, a privileged operation request to copy data or modify the data;
   obtaining a plurality of metrics for the privileged operation request;
   calculating an anomaly score for the privileged operation request, based on the plurality of metrics;
   making a first determination, based on the anomaly score, that the privileged operation request is anomalous;
   based on the first determination:
      placing a hold on the privileged operation request; and
      notifying a security manager that the privileged operation request is anomalous, wherein the security manager is operable to override the hold placed on the privileged operation request.

7. The non-transitory computer readable medium of claim 6, wherein the privileged operation request is to copy the data to an external device operatively connected to the client device.

8. The non-transitory computer readable medium of claim 7, wherein making the first determination that the privileged operation request is anomalous, comprises:
   comparing the anomaly score for the privileged operation request to a plurality of anomaly scores in a comparative subset of operation metrics entries, wherein the anomaly score for the privileged operation request exceeds a threshold based on the plurality of anomaly scores.

9. The non-transitory computer readable medium of claim 8, wherein prior to making the first determination that the privileged operation request is anomalous, the method further comprises:
   obtaining the comparative subset of operations metrics entries, comprising:
      selecting, in an operations database, a plurality of operation metrics entries, wherein the plurality of operation metrics entries each have a first metric that is identical to a second metric of the privileged operation request.

10. The non-transitory computer readable medium of claim 9, wherein the identical metric is one selected from the group consisting of an attached device identifier and a total attached device duration.

11. A client device, comprising:
    storage device;
    data stored on the storage device; and
    a processor executing a privileged operations monitor, wherein the processor is configured to perform a method for holding an anomalous privileged operation, comprising:
        receiving a privileged operation request to copy the data or modify the data;
        obtaining a plurality of metrics for the privileged operation request;
        calculating an anomaly score for the privileged operation request, based on the plurality of metrics;
        making a first determination, based on the anomaly score, that the privileged operation request is anomalous;
        based on the first determination:
            placing a hold on the privileged operation request; and
            notifying a security manager that the privileged operation request is anomalous, wherein the security manager is operable to override the hold placed on the privileged operation request.

12. The client device of claim 11, wherein the privileged operation request is to copy the data to an external device operatively connected to the client device.

13. The client device of claim 12, wherein making the first determination that the privileged operation request is anomalous, comprises:
    comparing the anomaly score for the privileged operation request to a plurality of anomaly scores in a comparative subset of operation metrics entries, wherein the anomaly score for the privileged operation request exceeds a threshold based on the plurality of anomaly scores.

14. The client device of claim 13, wherein prior to making the first determination that the privileged operation request is anomalous, the method further comprises:
    obtaining the comparative subset of operations metrics entries, comprising:
        selecting, in an operations database, a plurality of operation metrics entries, wherein the plurality of operation metrics entries each have a first metric that is identical to a second metric of the privileged operation request.

15. The client device of claim 14, wherein the identical metric is one selected from the group consisting of an attached device identifier and a total attached device duration.

* * * * *